Sept. 6, 1932.   C. A. ROEDER   1,875,500
VEHICLE SEAT
Filed Feb. 12, 1931
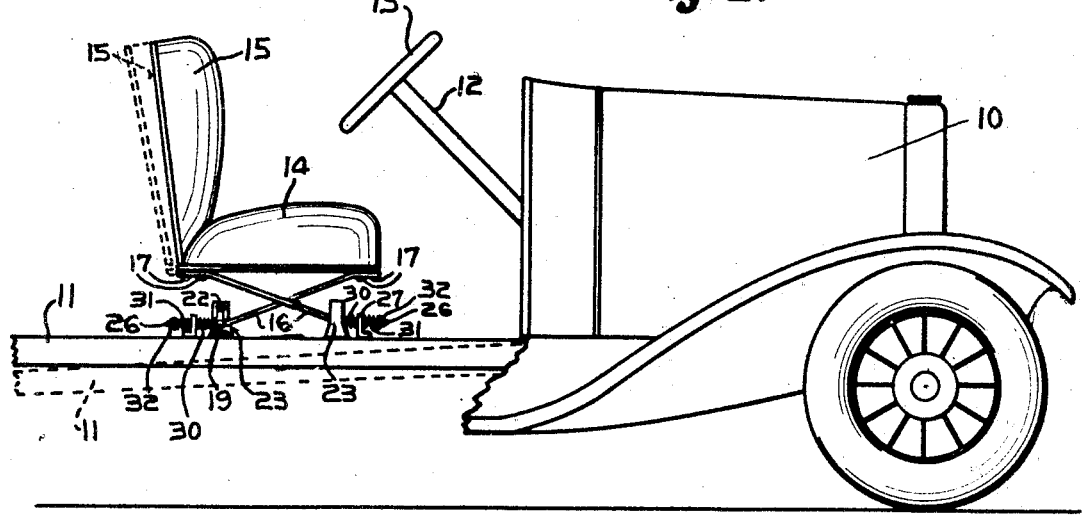
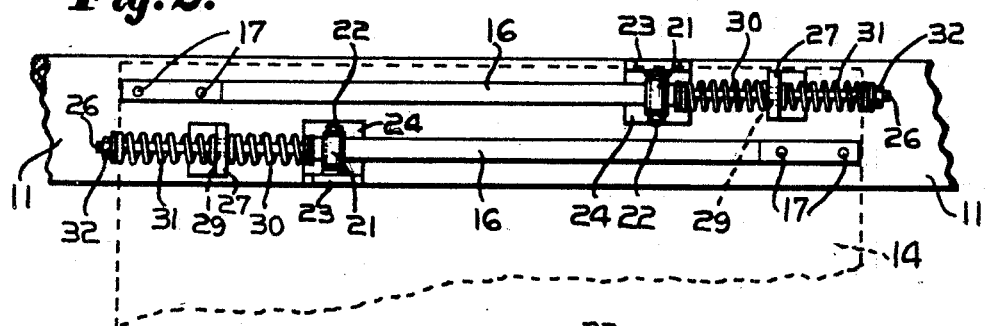
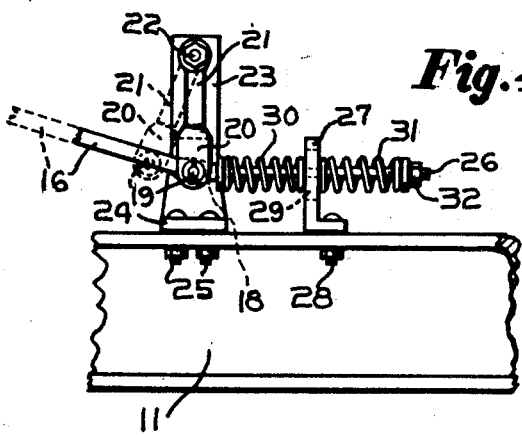
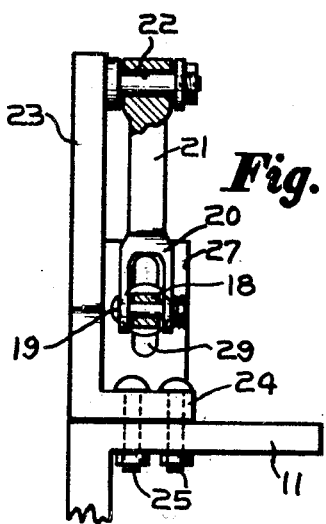
Inventor
C. A. Roeder
By Arthur H. Sturges
Attorney Patented Sept. 6, 1932

1,875,500

UNITED STATES PATENT OFFICE

CLYDE A. ROEDER, OF OMAHA, NEBRASKA

VEHICLE SEAT

Application filed February 12, 1931. Serial No. 515,149.

The present invention relates to seats adapted for use on vehicles of all kinds and the like, such as upon automobiles, motor boats, airplanes, tractors and the like, and the purpose of the present invention is to provide an improved seat mounting for maintaining the seat stable and in a relatively fixed position with respect to the occupant or operator irrespective of the vibrations and movements of the vehicle to which the seat is attached.

Another object of the present invention is to provide a seat and a mounting therefor adapted to be used in motor vehicles and the like and adapted to be occupied by the pilot or driver of the vehicle so that the pilot or driver may remain in a relatively steady position with respect to the steering wheel or other controlling apparatus of the vehicle, and wherein the seat will not partake of the rocking and vibrating movements of the vehicle so that the pilot or operator will not only have a greater control over the steering wheel and the like but will not become fatigued with long driving and will not be subjected to the vibration which is not only uncomfortable but which frequently seriously impairs the health of the pilot or driver.

Another object of the present invention is to provide an improved seat and mounting therefor which does not occupy any more room on the vehicle than do the present seats and which is of relatively simple and strong construction, and a structure which may be quickly and easily installed.

With the foregoing and other objects in view, the invention will be more fully described hereinafter, and will be more particularly pointed out in the claims appended hereto.

In the drawing, wherein like symbols refer to like or corresponding parts throughout the several views Figure 1 is a fragmentary side elevation of the forward portion of a motor vehicle having a seat mounted thereon according to the present invention, the dotted lines showing the usual swinging or vibration of the vehicle and seat when the latter is mounted in the present day usual manner.

Figure 2 is a fragmentary, enlarged, top plan view taken through the lower portion of the seat mounting at one side thereof, the dotted lines showing the relative position of the seat.

Figure 3 is a further enlarged fragmentary view, partly in section, taken through one of the pivotal mountings for the seat, and Figure 4 is a fragmentary side elevation of one of the pivotal mountings as applied to the frame of the vehicle.

Referring now to the drawing, 10 designates a motor vehicle which is provided with the usual frame 11 and which is provided with a steering post 12 with a steering wheel 13 adapted to be grabbed by the hand of the pilot or operator. The vehicle is provided with a seat 14 which is located in rear of the steering post 12 in the usual manner and which is provided with a back 15 of any suitable construction.

According to the present invention the seat 14 is supported at each side by a pair of crossed arms 16 which are of any suitable relatively strong material and which may be resilient to some degree if desired. The arms 16 may be relatively flat as shown, and at their upper ends are secured by rivets 17 or the like against the underside or bottom of the seat 14. The arms 16 at their upper ends are secured adjacent to the front and rear edge portions of the seat 14 and the arms themselves extend in cross relation downwardly beneath the seat 14, as clearly shown in Figure 1.

At their lower ends, the arms 16 are provided with transverse cylinder or barrel portions 18, one for each arm 16. Each cylindrical portion 18 receives therethrough a transverse pivot pin 19 which is carried in the fork 20 on the lower end of a link 21 which is pivotally supported at its upper end upon a bolt or pin 22 which projects laterally from one side of a post 23.

The fork 20 straddles the cylindrical portion 18, as clearly shown in Figure 3, so that the weight imposed upon the arm 16 is carried directly and centrally through the pivoted link 21, and the lower end of the arm 16 is thus pivotally and hingedly supported upon the post 23. The post 23, at its lower end, is provided with a base flange 24 which is adapted to seat upon and be secured to the upper side of the side frame 11 of the vehicle, bolts 25 or the like being used for securing the flange 24 rigidly in position. The inherent resiliency of the arms 16 together with the weight imposed thereon normally maintains the links 21 in a downwardly extending vertical position.

Each arm 16 is provided, beyond the cylindrical portion 18, with a relatively horizontally extending shaft portion 26 which slidably engages through a bracket plate 27 which extends in an upright position from the frame bar 11 of the vehicle and which may be secured thereto by a bolt 28 or the like. The bracket plate 27 is provided with a vertical slot 29, Figure 3, through which the shaft portion 26 is adapted to move longitudinally and also to have vertical play.

The shaft portion 26 is provided, at opposite sides of the bracket plate 27, with a pair of check springs 30 and 31 which are preferably of the coil type and which are provided with the usual washers or bearing members at opposite ends. The springs 30 and 31 engage at their adjacent ends against the opposite sides of the bracket plate 27 while the outer ends of the springs 30 and 31 bear respectively against the cylindrical portion 18 and an adjustable nut 32 which is threaded upon the outer end of the shaft portion 26. Thus, the tension placed upon the springs 30 and 31 may be regulated to some extent, particularly the spring 31, and the tension of the springs may also be regulated with respect to the normal angle of suspension of the adjacent links 21.

The springs 30 and 31 are adapted to offer resistance to the swinging of the links 21 in either direction so that when the vehicle frame 11 is raised or lowered, such as shown in dotted lines in Figure 1, the weight of the operator upon the seat 14 offers considerable resistance to the swinging of the seat 14 to a correspondingly tilted position, and such action is permitted by the yielding of the springs 30 or 31, depending upon the direction in which the vibration takes place.

Thus, the seat 14 will not abruptly follow the movements of the frame 11 but will permit the operator to sit upright in a relatively stationary position while the frame 11 is permitted to vibrate freely beneath the seat and without affecting the latter. It is also apparent that the springs 30 and 31 will permit the seat 14 to assume to a more or less extent the desired angle for the convenience and ease of the operator to accommodate the operator behind the steering wheel 13. Thus, the operator is not subject to the vibration and various small movements of the vehicle and the position of the operator with respect to the steering wheel 13 is relatively fixed so that there is less fatigue in driving the vehicle.

There is a post 23 provided for each of the arms 16, and the posts 23 are arranged in offset relation relatively to the length of the vehicle, as shown in Figure 2, so as to permit the arms 16 to be disposed in cross relation without interfering with the operation of the various parts. The lower end of each arm 16 is provided with the springs 30 and 31 and the suspension link 21 so that each arm 16 is independently supported both as to a swinging and hinging movement and also as to a resilient movement checked in opposite directions by the springs 30 and 31. The resiliency of the arms 16 is sufficient to permit of the various movements thereof so as to absorb the vibration and rocking movements of the frame 11 during the travel thereof.

It will be apparent that the improved seat mounting of this invention does not interfere with the seat structure nor the back structure thereof and consequently various types of seats and backs may be provided, and the structure does not in any way interfere with the upholstery of the seat and back and consequently is well adapted to motor vehicles and seats of the ordinary construction now in use.

It is obvious that various changes and modifications may be made in the details of construction and design of the above specifically described embodiment of this invention without departing from the spirit thereof, such changes and modifications being restricted only by the scope of the following claims.

What is claimed is:—

1. A seat support, comprising a pair of crossed arms, means for securing the upper ends of the arms to the underside of the seat, said arms having cylindrical portions on their lower ends and provided with shaft portions extending substantially horizontally from the cylindrical portions, posts for said crossed arms adapted for attachment to a supporting frame, links pivotally mounted on the upper ends of the posts, said links having forks at their lower ends adapted to embrace said cylindrical portions of the arms, pivot pins carried by the forks of the links and engaging through said cylindrical portions of the arms for hingedly connecting the arms to the lower ends of the links, bracket plates adapted to be mounted on the support in spaced relation to the post, and having vertical slots therein adapted to receive said shaft portions of the arms therethrough, and springs mounted on said shaft portions at opposite sides of the bracket plates and adapted to bear thereagainst for yieldably checking the movements of said arms and the swinging movements of said links.

2. A seat support, comprising a pair of crossed arms secured at their upper ends to the underside of a seat, posts mounted on a supporting frame, links pivotally mounted on the posts and having pivotal connection with the lower ends of said arms, bracket plates spaced from said posts on said supporting frame, and springs disposed at opposite sides of the bracket plates and connected to said arms for checking the opposite movements thereof during the swinging of the links.

3. A seat support, comprising a pair of crossed arms attached at their upper ends to the underside of a seat, a post for each of said arms, a link pivotally mounted upon the upper end of each post and extending downwardly from its pivotal support, means for pivotally connecting the lower ends of said links to the lower ends of said crossed arms, said arms each having an outward extension projecting beyond the adjacent link, a bracket plate spaced from each of said posts and having an opening therethrough for receiving the adjacent extension of the crossed arms, and springs mounted on the extension of each crossed arm at the opposite sides of the adjacent bracket plate for checking the pivotal movement of the link in opposite direction and the movement of the adjacent crossed arm.

4. A seat support, comprising pairs of spaced crossed arms secured at their upper ends to the underside of a seat adjacent the opposite sides thereof, said crossed arms having at their lower ends cylindrical portions and shaft portions extending outwardly and substantially horizontally from the cylindrical portions, pairs of posts adapted to be mounted on a support beneath the seat adjacent the free ends of said arms, links pivotally suspended on said posts, means for hingedly connecting the lower ends of the links to said cylindrical portions of the arms, bracket plates mounted on said support beneath the seat in spaced relation outwardly of the post, said bracket plates having slots therethrough adapted to receive the shaft portions of the arms, and springs mounted upon said shaft portions of the arms at the opposite sides of said bracket plates and adapted to engage thereagainst for checking the movement of said links and arms during the relative movement of the support beneath the seat.

5. A seat support, comprising a pair of crossed arms having their upper ends secured to the under side of a seat, a post for each of said arms arranged adjacent the lower free ends thereof, links pivotally mounted on said posts and suspended therefrom, means pivotally connecting the lower ends of said links to the adjacent lower ends of said crossed arms, a pair of opposed checking springs mounted on each of said arms and a fixed abutment disposed between the springs of each pair, said springs adapted to absorb vibration and shock between the posts and the arms and for yieldingly supporting the seat over the posts.

In testimony whereof, I have affixed my signature.

CLYDE A. ROEDER.